United States Patent [19]
Highnote et al.

[11] 3,987,490
[45] Oct. 19, 1976

[54] ROTATING READ/WRITE SYSTEM FOR NRZI DATA

[75] Inventors: Jerry Lee Highnote; Richard Lewis O'Day, both of Boulder, Colo.

[73] Assignee: International Business Machines Corporation, Armonk, N.Y.

[22] Filed: Mar. 3, 1975

[21] Appl. No.: 555,017

[52] U.S. Cl. .................................. 360/108; 360/51
[51] Int. Cl.[2] ........................ G11B 5/52; G11B 5/09
[58] Field of Search ............... 360/39, 41, 46, 51, 360/62, 68, 84, 108

[56] References Cited
UNITED STATES PATENTS

| | | | |
|---|---|---|---|
| 3,560,946 | 2/1971 | Ehalt et al. ........................ | 360/108 |
| 3,838,453 | 9/1974 | Buslik et al. ....................... | 360/84 |
| 3,864,739 | 2/1975 | Jackson .............................. | 360/84 |

*Primary Examiner*—Vincent P. Canney
*Attorney, Agent, or Firm*—Joscelyn G. Cockburn

[57] ABSTRACT

A rotating head magnetic tape unit having a fixed stator and a rotating rotor is disclosed. A plurality of transformers are positioned between the rotor and the stator so as to establish an interface for the transmission of electrical signals. Circuit means is provided on the rotor of the rotating head magnetic unit for reclocking data phase shifted by the transformer interface, for protecting against inadvertent write on a magnetic tape, and for synchronizing the clock with the data in a write driver whereby the clock may be used as A.C. bias for the written signal. An N times data frequency clock signal received on the rotor is divided N/2 to obtain the reclocking signals. With regard to the synchronization between the clock and write driver, the N times data frequency clock on the rotor is synchronized on the write driver with the data to accomplish A.C. bias recording.

14 Claims, 4 Drawing Figures

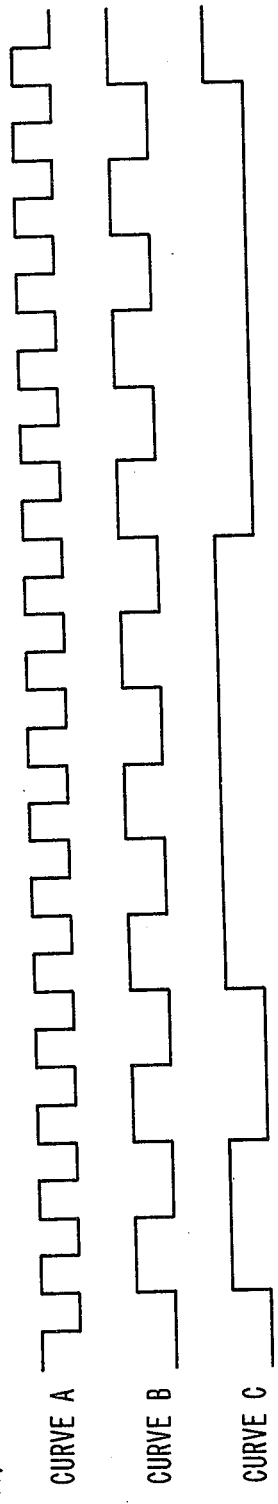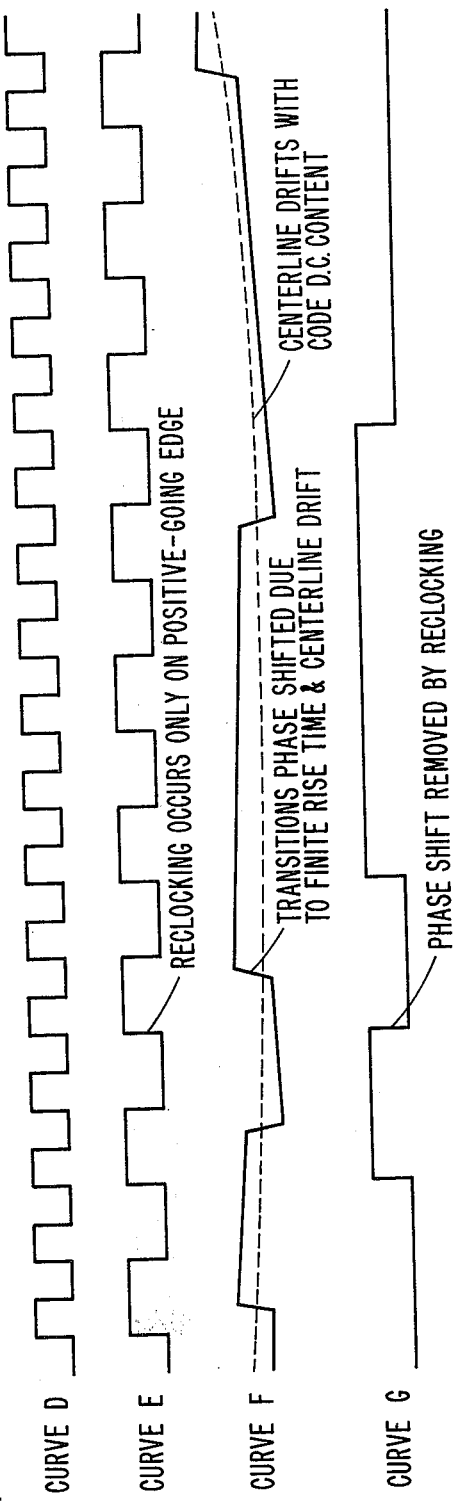

ROTATING READ/WRITE SYSTEM FOR NRZI DATA

BACKGROUND OF THE INVENTION

1. Field of the Invention

This invention relates to the field of dynamic magnetic information storage and/or retrieval, and more specifically, to a record transport with one or more rotating heads which record and/or reproduce machine-convertible information while moving, i.e., rotating, in transducing relationship with a magnetic web or tape; this information being oriented as magnetic domains to form information tracks which extend generally traverse to the longitudinal tape length.

2. Prior Art

Rotating head magnetic tape units are widely known. In one form of prior art device, a tape guiding structure in the form of a generally cylindrical mandrel or drum includes a rotating head wheel which carries one or more read/write heads. The magnetic tape engages the mandrel at one point, makes a helical wrap about at least a portion of the mandrel and exits the mandrel at a point which is both axially and circumferentially spaced from the entrance point. The angle of helical tape wrap can vary in accordance with design choice, but is usually between 180° and 360°. The head wheel rotates so as to sweep its magnetic head or heads traversely across the tape. The angle at which the head enters and exits the tape may vary in accordance with design choice, slightly less than 90° to a small angle such as 15°.

Another form of prior art device is one wherein the head wheel is associated with a tape guiding structure which bends the tape traversely into an arcuate shape that conforms to the circumferential shape of the head wheel. In this device the tape travels in a generally straight line past the head wheel, and is traversely bent by the associated guide as it enters the head wheel area.

The present invention finds utility with either aforementioned type of device, and has been found particularly useful with the helical wrap device.

Generally, in either of the above mentioned devices, the rotating head wheel has one or more magnetic transducers which read or write data on the magnetic media. This head wheel is attached to a rotating structure and the combination is called the rotor. The rotor communicates with the fixed section or stator of the rotating head magnetic tape unit via conductive or transformer interface.

The aforementioned prior art rotating head tape units are plagued with several problems. One of the major problems encountered with these devices is that of the frequency band limited nature of the rotating interface in conjunction with the magnetic transducers. This frequency band limitation is due to the typical inductive nature of the magnetic transducer, stray cabling capacitance and the reactive nature of the rotating coupler. If the rotating coupler is a transformer, physical packaging constraints limit the achievable high and low frequency response. If the rotating coupler is slip-rings or bushes, noise is an additional factor limiting high frequency response. Capacitive couplers suffer similar problems to transformers.

This frequency band limitation has four distinct problems: (1) The limited low frequency response constrains the code selection to those codes with no low or zero frequency components in their power spectrum. These are typical codes of the frequency modulation (F.M.) family which require higher channel bandwidths to pass a given information data rate. (2) The high frequency limitations constrains the allowable information rate which for rotary head devices is low compared to modern computing systems; typically 5–15 megabits in prior art systems. (3) The pass band limitation also results in phase distortion of which the low frequency is non-correctable. This distortion, in a digital recording channel, manifests itself as bit shift causing reproduce errors. This limits the achievable recording linear density and/or readback reliability. (4) The readback or reproduce amplifier is remote from the reproduce transducer and is connected to the transducer via the reactive rotary coupler. To achieve high bandwidth, normally the transducer impedance must be reduced to compensate for coupler leakage inductance and cable capacitance. This is at the expense of readback signal amplitude. Also the reactive nature of the coupling network presents considerably more noise (both thermal and environment) to the amplifier. Therefore a significant decrease in signal-to-noise ratio occurs over that which would be obtainable if the read amplifier were directly matched to the read transducer. This again limits achievable linear recording densities and/or readback reliability at any given data rate.

The frequency limitations of the rotary couplers also limit the use of A.C. (alternating current) Bias Write recording. High density recording, approximately 20,000 flux changes per inch or greater, appears to require A.C. Bias Write if satisfactory reliability is to be obtained. This A.C. Bias Write requires the channel to pass a frequency several times higher than the highest data rate to the write head. When the maximum frequency obtainable is limited, if A.C. Bias Write is desired, then data rate must be decreased.

OBJECTS OF THE INVENTION

It is therefore an object of the invention to transmit electrical signals across the transformer interface of a rotating head tape unit in a more efficient manner than was heretofor been possible.

It is another object of the invention to increase the data rate of the data transmitted across the interface of a rotating head magnetic tape unit.

It is another object of the invention to restore the write data integrity, which has been corrupted due to the rotary interface, prior to writing that data on tape.

It is another object of this invention to maximize the readback signal to noise ratio by providing the means to directly couple and match the read preamplifier to the read head.

It is a further object of the invention to provide adequate control to the write system and prevent inadvertent write on the magnetic media with an absolute minimum or rotary couplers.

It is still a further object of the invention to achieve A.C. bias recording with a lower bias frequency than has heretofor been possible.

SUMMARY OF THE INVENTION

The present invention provides an improvement over the prior art by providing a synchronous frequency clock signal which interlocks the electronic circuit means on the rotor with the electronic circuit means on the stator. In achieving the interlocking scheme, a clock signal having frequency equivalent to an integral multiple of the highest frequency component of the data is transmitted with the data across the transformer interface to the electronic circuit means on the rotor. This synchronous frequency clock is used for gating the write and erase head electronics so that the heads can perform their respective functions.

The use of active electronics on the rotor allows the use of transmission line techniques in the design of the transformers. These transmission line transformers coupled with proper line terminations provide an externally wide band interface. This wide band interface permits the passing of the very high data rates and the more efficient non-return to zero (NRZ/NRZI) codes.

Due to the fact that the data has a plurality of harmonics, phase distortion occurs in the data as it is transmitted across the transformer interface. The present invention restores the phase shift by tapping the synchronous Nx (times) frequency clock on the rotor and applying said tapped signal to a divide-by-two circuit means. The output of the divide-by-two circuit means is used to reclock the data so as to restore the phase of the data to its original form, i.e., prior to its transmission across the interface.

In one feature of the invention, the synchronous frequency clock provides the frequency source for a synchronized A.C. bias write driver which drives a write head to record information on a magnetic media. Also, the synchronous frequency clock is used for reclocking the data so as to restore it to its original integrity. Since the same synchronous frequency clock is used for providing the source for the A.C. bias writer and is used for reclocking the data, the bias signal and the data signal are synchronized. Whenever data signals and A.C. bias signals are synchronized a relatively lower A.C. bias signal is required for recording.

In another feature of the invention, inadvertent write or erase, due to a circuit failure, over previously recorded data is prevented by circuit means on the rotor which senses the presence of clock signals and the presence of data signals. Both of these signals must be present on the rotor before a write operation can be performed. In other words, the file protect feature of the present invention is achieved by providing circuit means on the rotor which senses the simultaneous presence of data signals and clock signals before the write means is enabled for writing data on the magnetic media. Should a circuit failure occur, means are provided for sensing such a failure and completely disabling the write/erase circuitry by removing all power from the rotor electronics.

The foregoing and other features and advantages of the invention will be apparent from the following more particular description of the preferred embodiment of the invention as illustrated in the accompanying drawings.

BRIEFF DESCRIPTION OF THE DRAWINGS

FIG. 3, including 3A and 3B, is a chart showing data and clock signals with phase shift as transmission occurs across the transformer interface.

DETAILED DESCRIPTION

Figure 1:
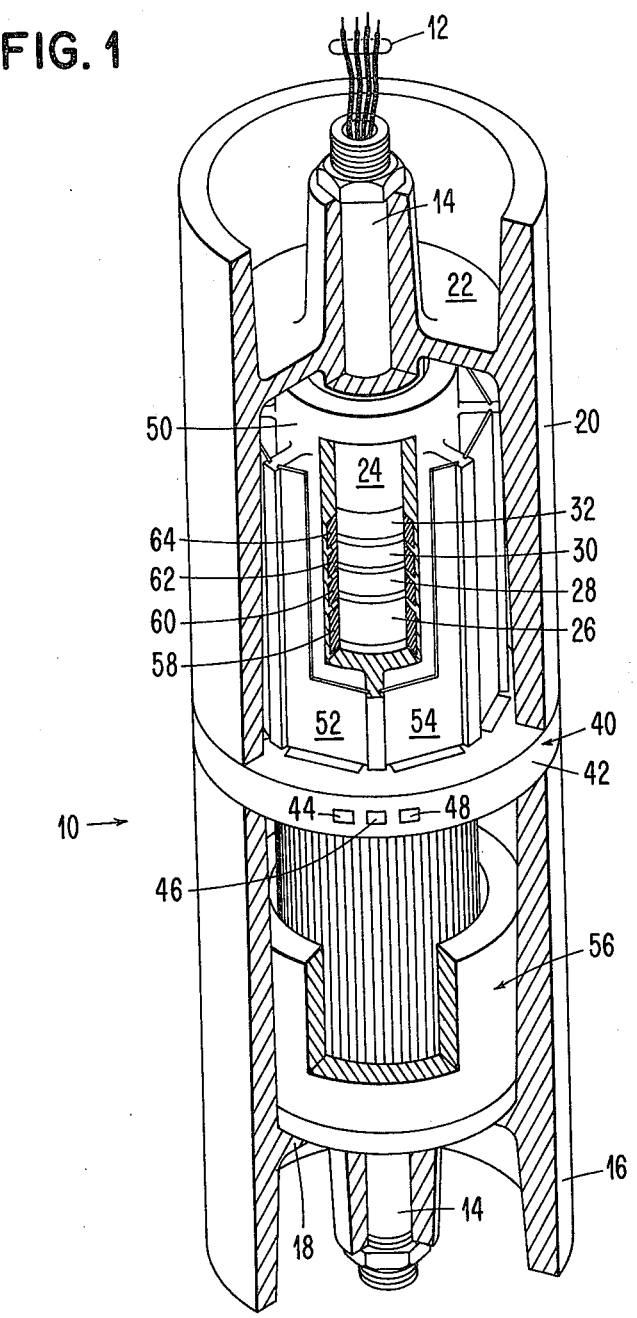
FIG. 1 is a perspective view of a rotating head tape unit embodying the present invention.

FIG. 1 is a simplified view of rotating helical tape wrap mandrel/head wheel unit 10, hereinafter called read/write unit 10, embodying the present invention.

As is shown in the figure, read/write unit 10 is portable. Communication between read/write unit 10 and the tape transport unit (not shown) is effectuated via terminal 12. Terminal 12 comprises a plurality of cables which transmit electric signals to and from read/write unit 10. Read/write unit 10 comprises a fixed stationary shaft 14. Stationary shaft 14 functions as support means and reference means for the other components of read/write unit 10. Lower mandrel half 16 is attached to shaft 14 by a lower support plate 18. Upper mandrel half 20 is affixed to shaft 14 by upper support plate 22. The relationship between the lower mandrel half 16 and upper mandrel half 20 is such that the surface are even, i.e., the surface of the upper mandrel half and the surface of the lower mandrel half are located in the same plane or line. Affixed to the outer surface of shaft 14 is stator 24. Stator 24 is stationary and does not rotate. Stator 24 comprises a plurality of transformer windings 26–32. As will be explained subsequently, windings 26–32 are paired with suitable windings which are located on the rotor. The combination of the stator windings and the rotor windings form an inductive interface which allows the transmission of electric signals between the rotor assembly and the stator assembly. As was disclosed previously, the invention is directed towards read/write electronics for the rotor and stator.

Still referring to FIG. 1, rotor and head assembly 40 is positioned in space relationship with stator 24. Rotor and head assembly 40 comprises head wheel 42 which is positioned between upper mandrel half 20 and lower mandrel half 16. The relationship between head wheel 42 and the upper and lower mandrel halves is such that the head wheel protrudes slightly above the surface of the mandrel halves. Head wheel 42 comprises write head 44, erase head 46 and read head 48. In operation, the length of magnetic media (not shown) is helically wrapped, in space relationship, around read/write unit 10. The relationship is such that any of the above mentioned heads may read, write or erase data on the oxide surface of the magnetic media. Head wheel 42 is circular in shape and is attached to support cylinder 50. The upper surface of head wheel 42 has a plurality of channels or receptacles for receiving a plurality of circuit cards. Two of these circuit cards, 52 and 54 are shown in FIG. 1. The circuit cards are arranged in circular configuration around support cylinder 50. Support cylinder 50 is supported by two pairs of ball bearings (not shown). Each pair of ball bearings is located at one end of cylinder 50. Attached to one end of support cylinder 50 is a printed circuit armature motor 56 for rotating rotor and head assembly 40. As was mentioned previously, a plurality of transformer windings 58–64 is attached to the inner surface of support cylinder 50. The relationship between windings 26–32 and windings 58–64 is such that if windings 26–32 are primary windings, then windings 58–64 are secondary windings and vice versa. Write head 44, erase head 46 and read head 48 are connected to circuit card 52, 54 . . . etc; while circuit cards 52, 54 . . . etc, are connnected to windings 58–64.

Figure 2:
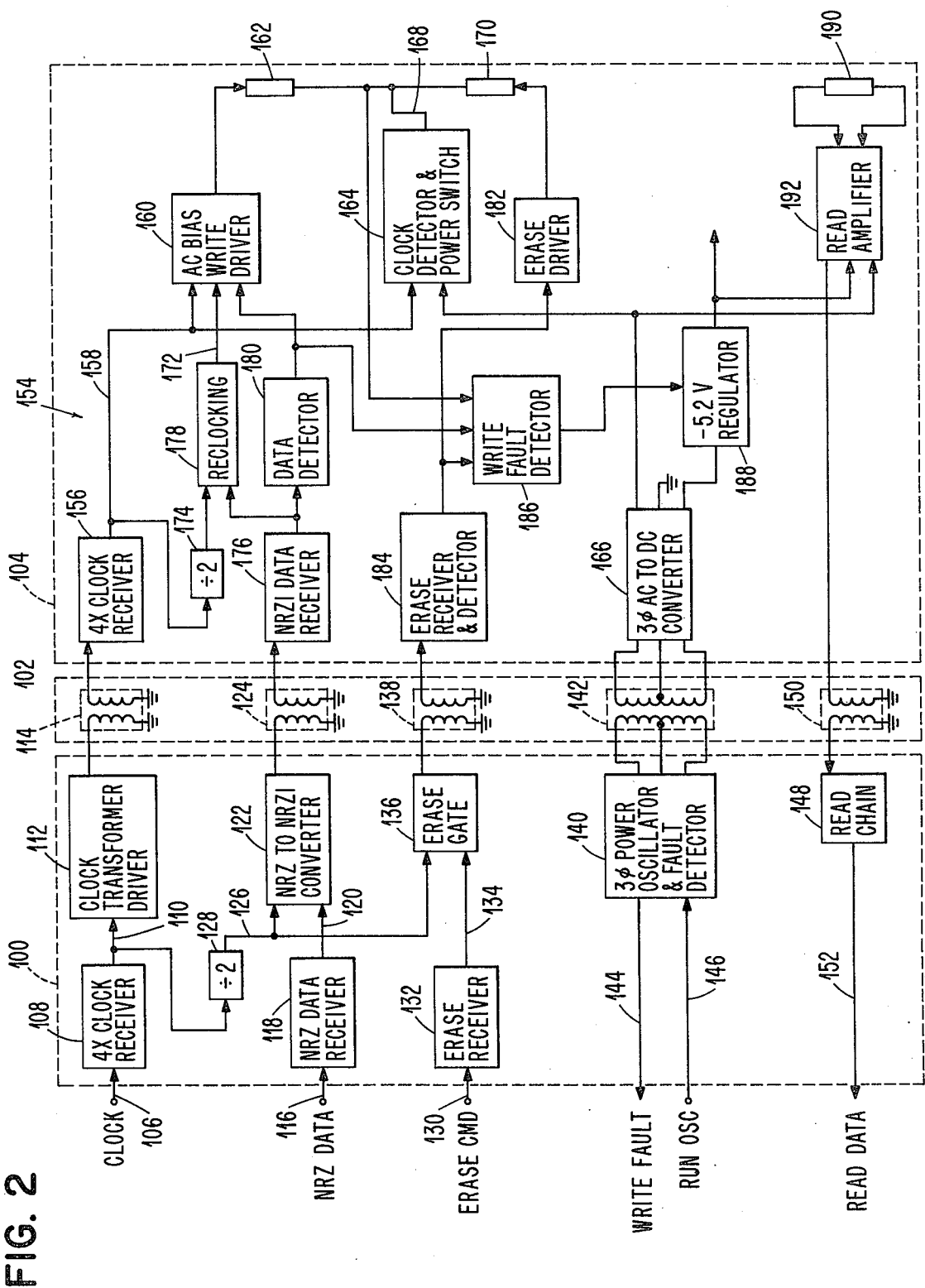
FIG. 2 is a block diagram showing the rotor electronic circuitry and the stator electronic circuitry.

Referring now to FIG. 2, a conceptual representation of the read/write electronics for the present invention is shown. The read/write electronics comprises a first stationary assembly 100, hereinafter called stator 100. As will be explained subsequently, stator 100 comprises a plurality of circuits which receive data in the form of electrical signals and reconfigure the data for transmission across inductive interface 102. The data is then received by a second rotary assembly 104, hereinafter called rotor 104. Rotor 104 comprises a plurality of electronic circuit means which correlates the data representing signals, i.e., restore the symmetrical characteristic to the data signals so as to facilitate the writing of the electrical data onto a magnetic media.

Still referring to FIG. 2, a clock signal is generated and appears in terminal 106. The clock signal is generated by the control unit of the tape transport unit (not shown). Generally, the clock signal can be any even numbered multiple of the highest fundamental frequency component in the data signal, and is normally derived from the write clock in the tape control unit. For explanation purposes, the clock signal will be 4 X (four times), the highest frequency fundamental component in the data signal. The clock signal is then received by 4 X clock receiver 108 and is outputted on terminal 110. The clock signal on terminal 110 is in digital and D.C. form. In order to transfer the clock signal across inductive interface 102, the clock signal has to be converted into A.C. form. Therefore, clock transformer driver 112 converts the clock signal on terminal 110 into a form whereby it can be transmitted across transformer 114.

Likewise, data signal is generated and appears on terminal 116. Although the data on terminal 116 can be represented in any conventional coded form, the NRZ code will be used for explanation purposes. The NRZ data is then received by NRZ data receiver 118 and is outputted on terminal 120. NRZI converter 122 converts the data on terminal 120 into suitable form for transmission across transformer 124. NRZI converter 122 is controlled by a 2 X clock signal which appears on terminal 126. The 2 X clock on terminal 126 is developed by running the 4 X clock on terminal 110 through a divide-by-two circuit means 128.

An erase command is generated by the control unit of the tape transport and appears on terminal 130. The erase command signal is received by erase receiver 132 and is outputted on terminal 134. Erase gates 136 under the control of the 2 X clock gates the erase command signal for transmission across transformer 138.

Power oscillator 140 transmits 3 phase power across 3 phase transformer 142. Power oscillator 140 also detects any fault that occurs on the rotor by monitoring the interface current, and generates a signal on terminal 144 which warns the control unit of the tape drive that a problem or error has occurred on the rotor. Power oscillator 140 is under the control of a run oscillator signal which is generated by the control unit of the tape drive and appears on terminal 146. Read chain circuit means 148 receives data from transformer 150. Read chain circuit means 148 converts the data into digital form and outputs the data on terminal 152.

As is evidenced from the above description, inductive interface 102 comprises a plurality of transformers. For example, transformer 114 is a single phase transformer and is dedicated to the transmission of the 4 X clock. Similarly, transformer 124 is single phase and is dedicated to transfer NRZ data. Also, transformer 138 transfers the erase signal, and transformer 150 transfers data which has been read from a magnetic media. Transformer 142 has three phases and functions to transmit power and other information across the interface.

Referring now to FIG. 3A, a timing diagram depicting the relationship between data signals and clock signals prior to transmission across inductive interface 102 is shown. As is shown in the figure, the relationship between the clock signals and the data signals is symmetrical. Curve A represents the 4 X clock which is transmitted across inductive interface 102 and is used to interlock the rotor electronics with the stator electronics, thereby restoring symmetry to the data. Curve B depicts a 2 X clock which is used for gating the NRZI data depicted by Curve C.

Referring now to FIG. 3B, the relationship between the clock and the data is not symmetrical. Curve D depicts the 4 X clock after transmission across the interface. As is shown in the figure, the symmetry of the clock after transmission is in tact, i.e., the symmetry or phase of the clock is not shifted due to imperfections in the transformer interface 102. Also, the clock is single frequencing and thereby is not susceptible to phase shift. As will be subsequently explained, Curve E is the 2 X clock which is developed from the 4 X clock on the rotor and is used for reclocking the transmitted data. Curve F depicts the NRZI data after it has been received by electronic means on the rotor. As can be seen, the data is no longer symmetrical. The symmetry characteristics or imperfections which are seen in the data after the transmission across the inductive interface stems from two phenomena; namely, phase shift due to finite rise time and center line drift of the average component of the data signal. The finite rise time and the center line drift problems stem from the fact that the rotating transformer has bandwidth limitation and nonlinear phase characteristic. Curve G depicts NRZI data after it has been reclocked and restored to its symmetrical form which will allow error free writing of the data onto a magnetic media.

Referring now to FIG. 2, one of the functions of rotor electronics 154 is to reclock the data on the rotor so as to restore its symmetrical characteristics. The 4 X clock receiver 156 receives the 4 X clock on the rotor and outputs the clock signal on terminal 158. The 4 X clock signal is fed into A.C. synchronous bias write driver 160 and provides the frequency source for driver 160 thereby enabling write head 162 to write data onto a magnetic media. A.C. synchronized bias write driver 160 is controlled by the reclock data signal on terminal 172. The reclock data signal is developed as follows: the 4 X clock is fed into divide-by-two circuit means 174 and a 2 X clock is achieved on terminal 176. The 2 X clock is used to gate NRZI data from NRZI data receiver 176 into reclocking circuit means 178. Further, A.C. synchronized bias driver 160 is controlled by raw or ungated data from data detector 180.

Clock detection and power switch 164 hereinafter called enable means 164 senses for rotor power from 3 phase A.C. to D.C. converter 166 and senses for the 4 X clock. When the power and the 4 X clock is present on the rotor, enable means 164 outputs a signal on terminal 168 which enables write head 162 or erase head 170. Erase head 170 is controlled by erase driver 182 which is controlled by erase detector and receiver 184.

The file protect function of the invention, i.e., the inadvertent write feature, is achieved by write fault detection 186 which senses for write fault on the rotor. When a write fault is sensed regulator means 188 is shut down thereby removing power from the rotor. Simultaneously, a write fault signal (in the form of a low current), is generated by regulator means 188 and is transmitted and detected to stator 100. Write fault protection is provided by monitoring the 4 X clock, data, and the output erase receiver and detector 184, and shutting down rotor regulator 188 if a fault occurs. The loss of current is detected on stator 100 causing power oscillator 140 to shut down and initiate fault line 144 to the control unit (not shown).

Finally, the read head 190 reads data from a magnetic media (not shown) and feeds the data into read amplifier 192. The presence of read amplifier 192 on the rotor allows for direct coupling and impedance matching of the head with the read amplifier.

OPERATION

In operation, the run oscillator line on terminal 146 is raised starting 3 phase power oscillator 140 that provides excitation to the rotor electronics via three phase transformer 142. A delay (not shown) is made in fault detection means 186 to allow the rotor power system to come up and stabilize. If a rotor fault exists, regulator means 188 will trip. When the stator fault sense is activated, the loss of regulator means 188 is noted by the low current drawn. The system will shut down and initiate a fault to the control unit (not shown). The system is partitioned off until the controller (not shown) sends a new run oscillator command on terminal 146 for a retry. If not fault exists, a normal power on will take place. Power is provided to read amplifier 192, write driver 160, power switch 164, write fault 186 and write logics 156, 174, 176, 178, 180 and 184. The machine is in a read only mode with no power to either erase head 170 or write head 162.

For a write operation, the 4 X clock is initiated by the controller (not shown) and appears on terminal 106. The clock signal puts the machine in write status enabling the stator NRZI converter 176, erase gate 136, enable means 164, thus providing voltage to the write and erase heads, and finally enabling reclocking circuit means 178. Enabling means 164 only provides voltage to the heads. No current will flow until the erase and/or write drivers are enabled.

The raising of the erase command signal on terminal 130 by the controller (not shown) will gate the 2 X clock across inductive interface 102 to be detected on rotor 104. The presence of the 2 X clock will turn on erase driver 182 causing current to flow into erase head 170 from the previously activated write power switch.

The controller (not shown) starts NRZ data to NRZ data receiver 118. The data is converted to a NRZI data by NRZ converter 122 and is transmitted across transformer 138 of inductive interface 102. On rotor 104, the data is reclocked by a 2 X clock which is derived from the 4 X clock. Also, the presence of data is detected and used to gate on write driver 160. At the end of a record, the controller (not shown) drops the erase command, the 4 X clock is no longer gated across the interface and the erase driver turns off. When the end of data occurs, the phenomena is sensed by data detector 180 and write driver 160 is turned "off". At the end of a data block, the controller (not shown) stops the 4 X clock, and the machine is no longer in write status. The rotor writer power switch turns off removing voltage to the write and erase heads.

Due to the addition of electronics on the rotor of the rotating head device, the bandwidth of the device has been significantly broadened. As a result of the increase in bandwidth, a more efficient code family can be used, e.g., the NRZ code family. With a more efficient code family, the data transmission rate can improve significantly. For example, data transmission rating approximately between 30 and 40 megabits per second was measured with this device. Finally, the bit density on tape was significantly higher than the prior art since the relationship between bit density and the NRZ code family is 1 to 1.

While the invention has been particularly shown and described with reference to a preferred embodiment, it will be understood by those skilled in the art that the foregoing and other changes in form and in detail may be made therein without departing from the spirit and scope of the invention.

What is claimed is:

1. A signal processing system for controlling the transmission of electrical signals from a fixed assembly to a movable assembly comprising:
   transfer means, operably connected between the fixed assembly and the movable assembly, for transmitting the electrical signals;
   means establishing multi-frequency data-representing signals, operably connected to the input of said transfer means, said data representing signals having a given periodicity;
   first control means operably connected to the input of said transfer means, said first control means establishing first clock signals having a single frequency with said single frequency being an integral multiple of the highest frequency data contained in said multi-frequency data representing signal; and
   means operatively associated with the output of said transfer means for receiving and correlating said data-representing signals, and said clock signals to thereby establish a fixed time relationship therebetween for facilitating signal exchange with a recording media.

2. The signal processing system as claimed in claim 1 wherein the transfer means comprises a plurality of transformers, each transformer having a primary coil and a secondary coil in mating relationship so as to transfer electrical signals.

3. The device as claimed in claim 1 further including second control means, operably associated with the first control means, for generating second clock signals with a frequency less than that of the first clock signals whereby said second clock signals control the transfer of data across said transfer means.

4. The device as claimed in claim 3 further including write means, operably associated with said movable assembly, for writing the correlated data-representing signals onto the recording media.

5. In a rotating head transport system having a stator and a rotor read/write electronic system for NRZ data transmission comprising:
   a first set of transformer means operatively connected between the stator and rotor for transferring electronic signals, said first set of transformer means having inputs operatively associated with the stator and outputs operatively associated with the rotor;
   data means operably connected to the input of said transformer means for supplying NRZI data at a predetermined frequency;
   first clock means operatively connected to the input of the transformer means, said first clock means having a frequency N times the frequency of the NRZ data;
   second clock means operatively associated with the first clock means, for controlling the transfer of NRZI data, said second clock means having a frequency twice that of the NRZI data;

reclocking means operatively associated with the rotor for reclocking the NRZI data with a clock twice the frequency of said NRZI data so as to restore the phase relationship between the NRZI data and the second clock means prior to transmission; and synchronizing means operably connected with said rotor for synchronizing the first clock means with a bias frequency means, thereby enabling the writing of data on a media free of phase shift.

6. The read/write electronic system as claimed in claim 5 further including transducing means for writing the reclocked NRZI data onto a magnetic media.

7. The read/write electronic system as claimed in claim 6 further including:

erase means operatively associated with the second clock means for generating a first erase signal;

means affixed to the rotor for receiving the first erase signal and generating a second erase signal;

erase head affixed to the rotor for receiving the second erase signal and erasing data on the magnetic media; and enabling means affixed to the rotor for receiving the N times clock and generating an enabling signal, thereby enabling the erase head and writing means to perform their respective functions.

8. The read/write electronic system as claimed in claim 7 further including:

reading means for reading information from a magnetic media;

means operatively associated with said reading means for receiving the information;

second transformer means operably connected for transmitting the information; and receiving means operably connected to the stator for receiving the information and distributing said information.

9. In a rotating head magnetic tape unit having an inductive interface between the stator and the rotor read/write system for said rotor comprising:

data means for receiving electronic signals indicative of NRZ data from the interface, said electronic signals being of a predetermined periodicity;

clock means operably affixed to the rotor for receiving clock signals from the interface, said clock signals being an integral multiple of said data periodicity;

reclocking means operatively associated with the data means and the clock means for reclocking the data, and for reestablishing phase relationship between the data and the clock prior to transmission across the interface; and write head operatively associated with the reclocking means for writing the reclocked data onto a magnetic media.

10. The read/write system as claimed in claim 9 further including synchronizing means for synchronizing the interface clock with an A.C. bias, thereby providing a frequency source for writing data onto the magnetic media.

11. The read/write system as claimed in claim 10 further including erase means for receiving an erase signal from the interface;

drive means operably connected to said erase means; and erase head operatively associated with the drive means for erasing information on the magnetic media.

12. The read/write system as claimed in claim 11 further including inadvertent write protection means for preventing the writing of data over previously recorded information on the magnetic media.

13. The read/write system as claimed in claim 12 wherein the inadvertent write protection means comprises:

clock detection means for sensing the presence of the interface clock signals; and data detection means for sensing the presence of data signals, whereby the simultaneous presence of the clock signals and the data signals is necessary before a write operation can be performed.

14. The read/write system as claimed in claim 13 further including a stator fault sense circuit for sensing fault on said rotor, and generating an error signal across the interface indicative of the rotor fault.

* * * * *